United States Patent
Chen

(10) Patent No.: US 7,438,081 B1
(45) Date of Patent: Oct. 21, 2008

(54) VALVE FOR AN INFLATABLE AND METHOD OF USE

(76) Inventor: Xing Chen, 16323 Sturkie Ct., Charlotte, NC (US) 28277

(*) Notice: Subject to any disclaimer, the term of this patent is extended or adjusted under 35 U.S.C. 154(b) by 332 days.

(21) Appl. No.: 11/447,064

(22) Filed: Jun. 5, 2006

(51) Int. Cl.
*F16K 15/20* (2006.01)

(52) U.S. Cl. .................. 137/226; 137/223; 137/493.2; 137/493.9

(58) Field of Classification Search ...... 137/223–234.5, 137/512–543.23, 854, 859; 251/149.4, 149.8, 251/149.9, 82, 100; 141/114; 285/200, 205, 285/206, 330, 360, 361; 410/119, 124, 125, 410/41, 40, 90–101

See application file for complete search history.

(56) References Cited

U.S. PATENT DOCUMENTS

| | | | | |
|---|---|---|---|---|
| 2,657,704 A | * | 11/1953 | Fausek et al. | 137/859 |
| 3,108,610 A | * | 10/1963 | De See | 137/493 |
| 3,280,838 A | * | 10/1966 | Parkinson | 137/493.2 |
| 3,422,996 A | * | 1/1969 | Lipman | 251/100 |
| 4,478,587 A | * | 10/1984 | Mackal | 137/224 |
| 4,766,628 A | * | 8/1988 | Walker | 137/232 |
| 5,203,831 A | * | 4/1993 | Lind et al. | 137/223 |
| 5,941,272 A | * | 8/1999 | Feldman | 137/223 |
| 5,971,016 A | * | 10/1999 | Wass et al. | 137/541 |
| 6,036,169 A | * | 3/2000 | Wass | 251/82 |
| 7,021,326 B2 | * | 4/2006 | Rogier | 137/226 |
| 7,273,065 B1 | * | 9/2007 | Robbins | 137/223 |
| 7,275,494 B2 | * | 10/2007 | Polley et al. | 137/223 |
| 2003/0159731 A1 | * | 8/2003 | Wass et al. | 137/224 |

* cited by examiner

*Primary Examiner*—Stephen M. Hepperle
*Assistant Examiner*—Craig Price
(74) *Attorney, Agent, or Firm*—Ted Masters

(57) ABSTRACT

A valve for an inflatable includes both inflation/deflation and pressure release functions. The valve has a housing which receives a core, a spring, and a nut. The nut is threadably received by the core and slidably received by the housing, and holds the core and spring in place within the housing. The inflation function includes a one way valve, and the release pressure of the pressure release function may both be adjusted and disabled.

4 Claims, 10 Drawing Sheets

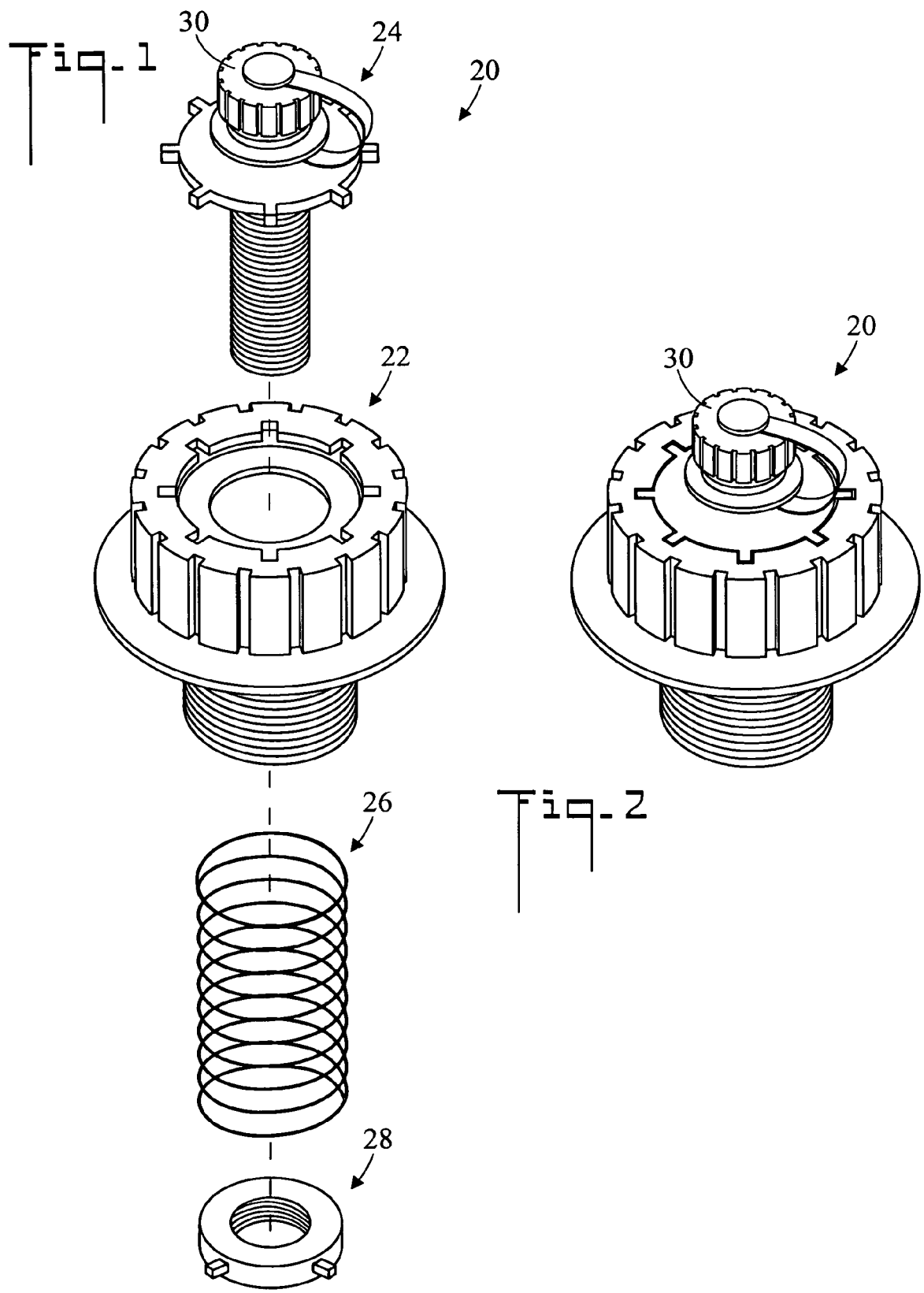

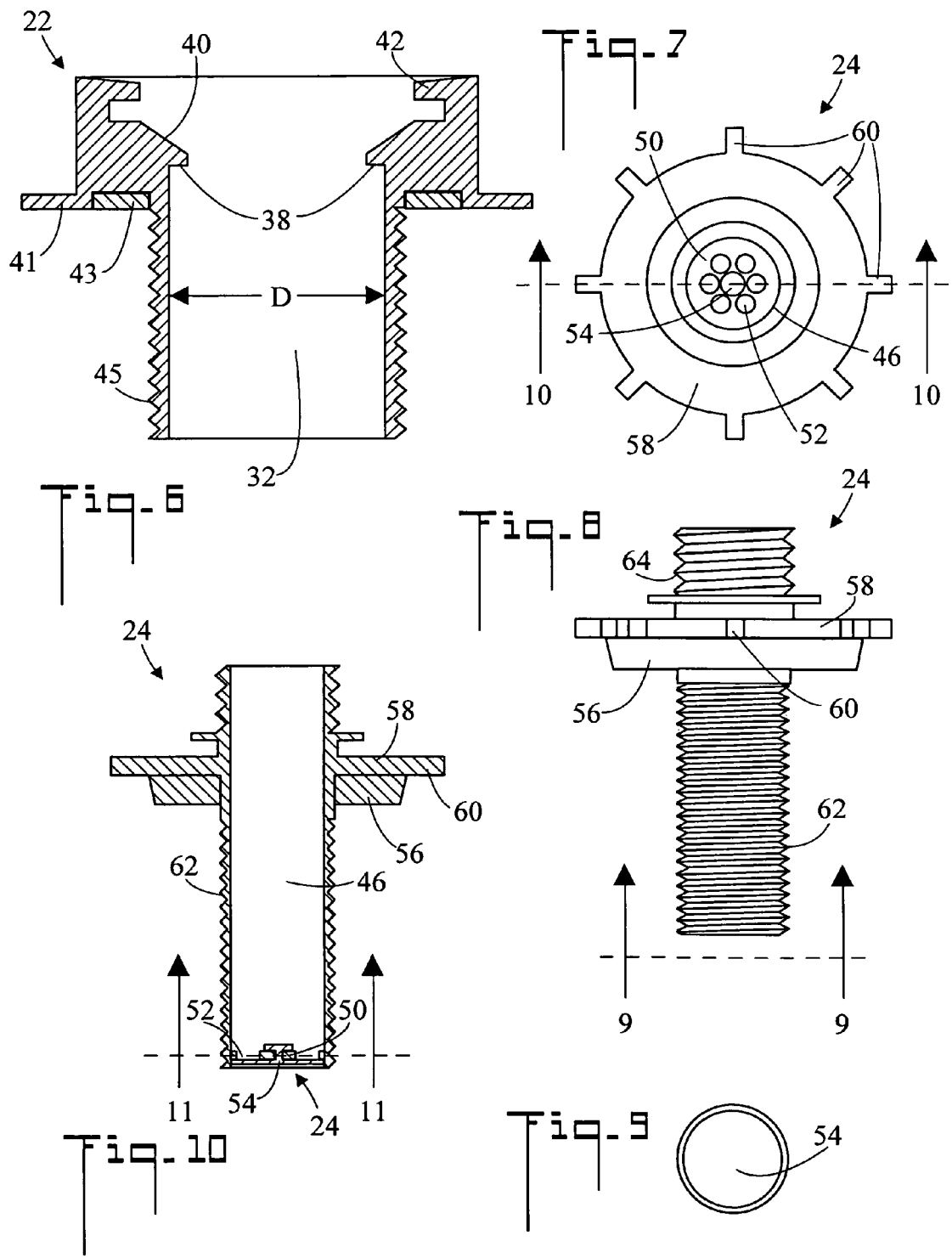

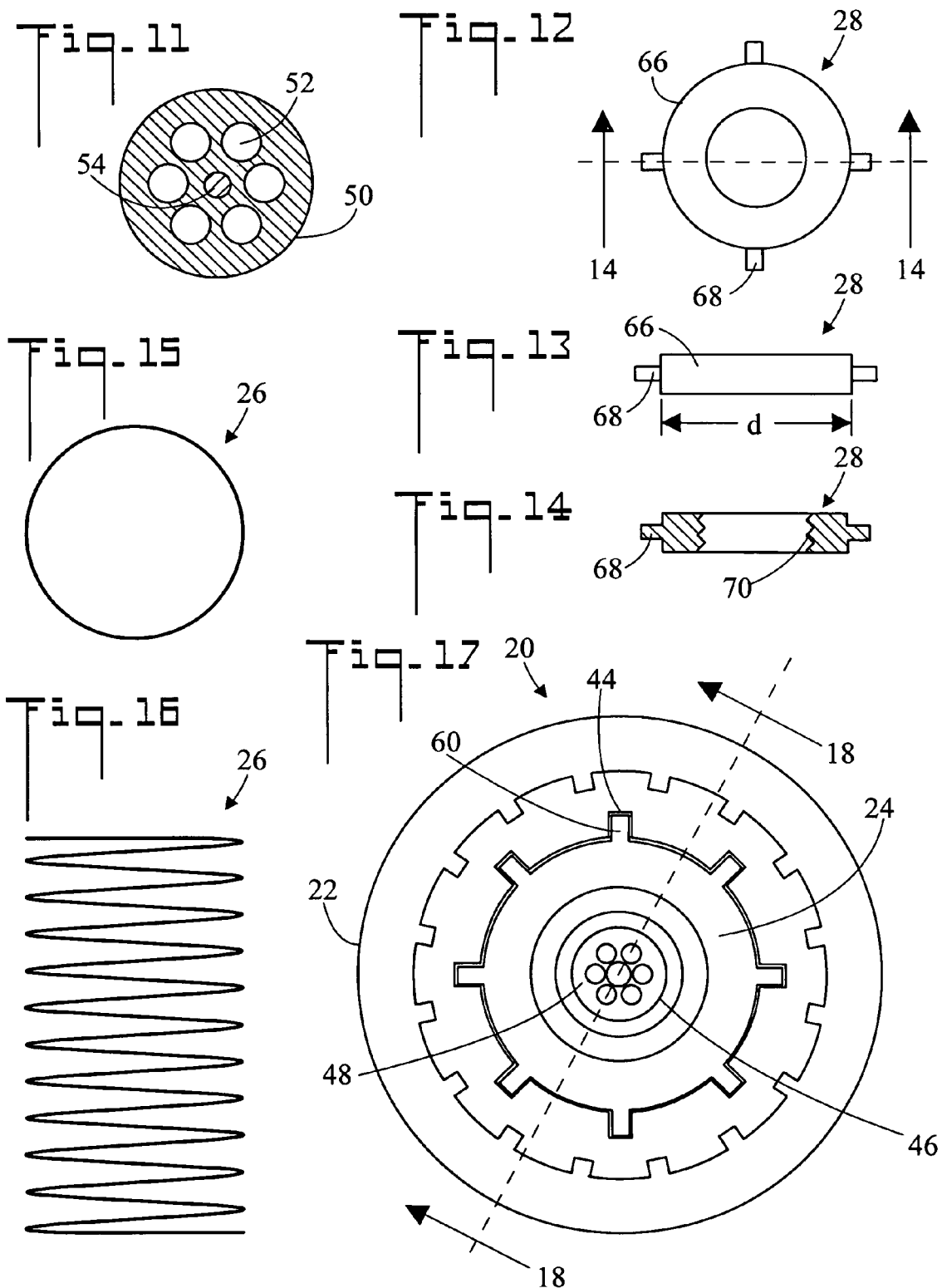

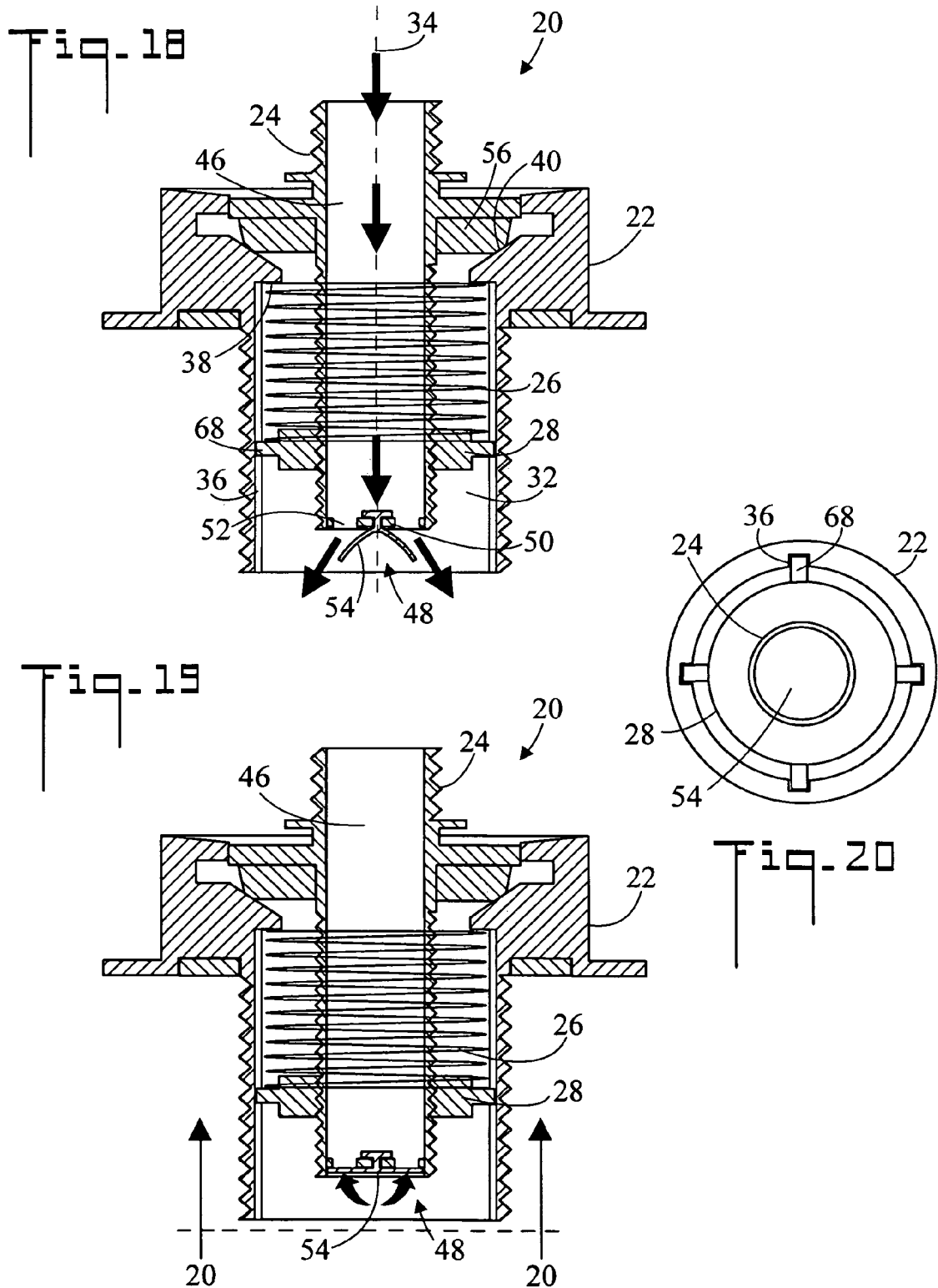

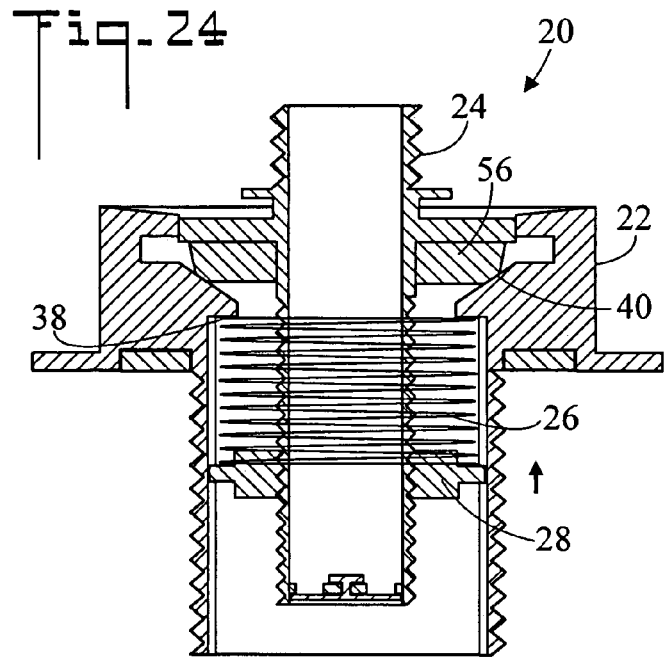
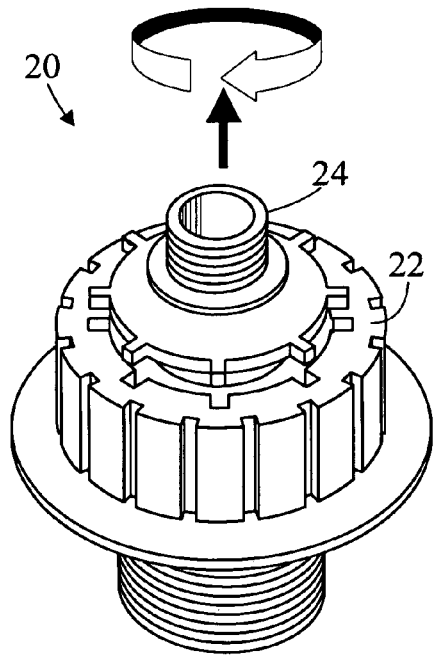
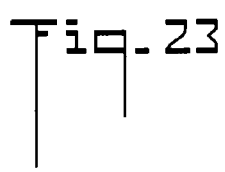
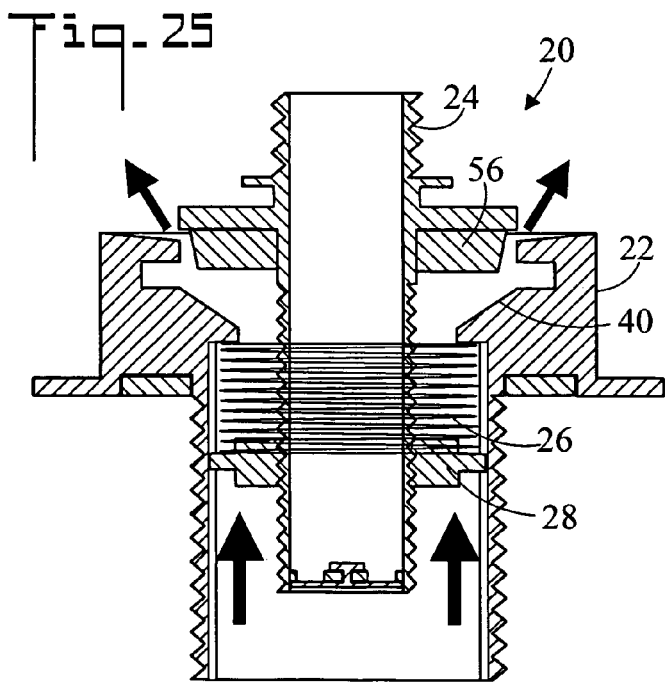

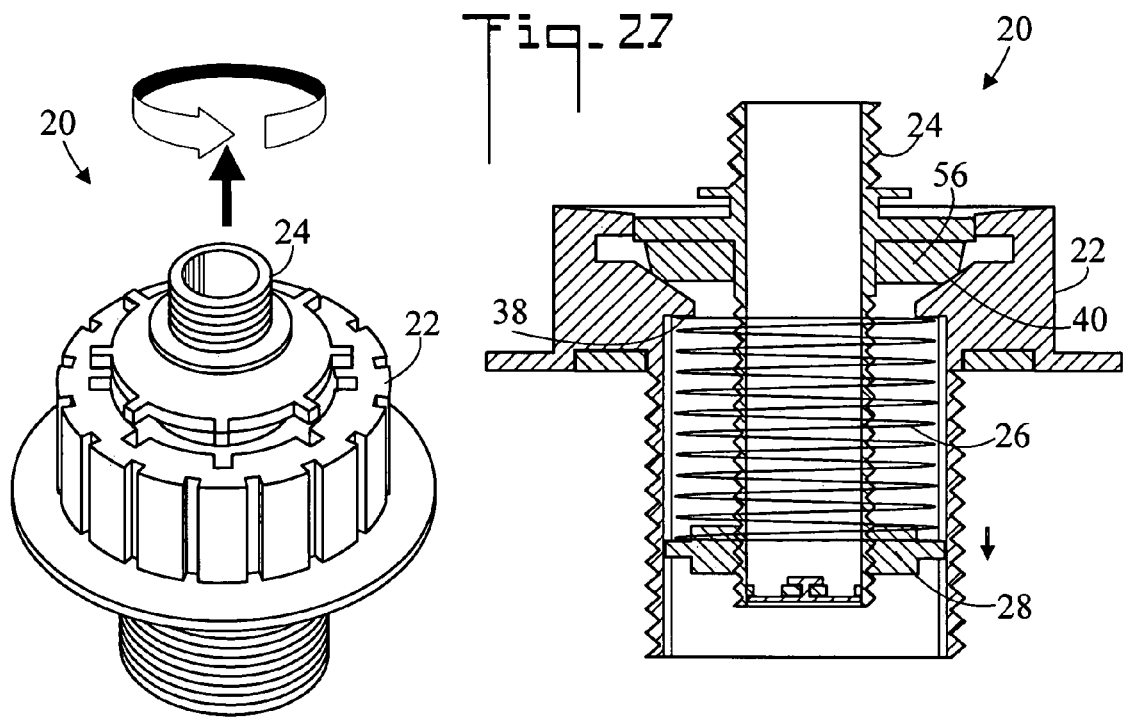
Fig. 27
Fig. 26
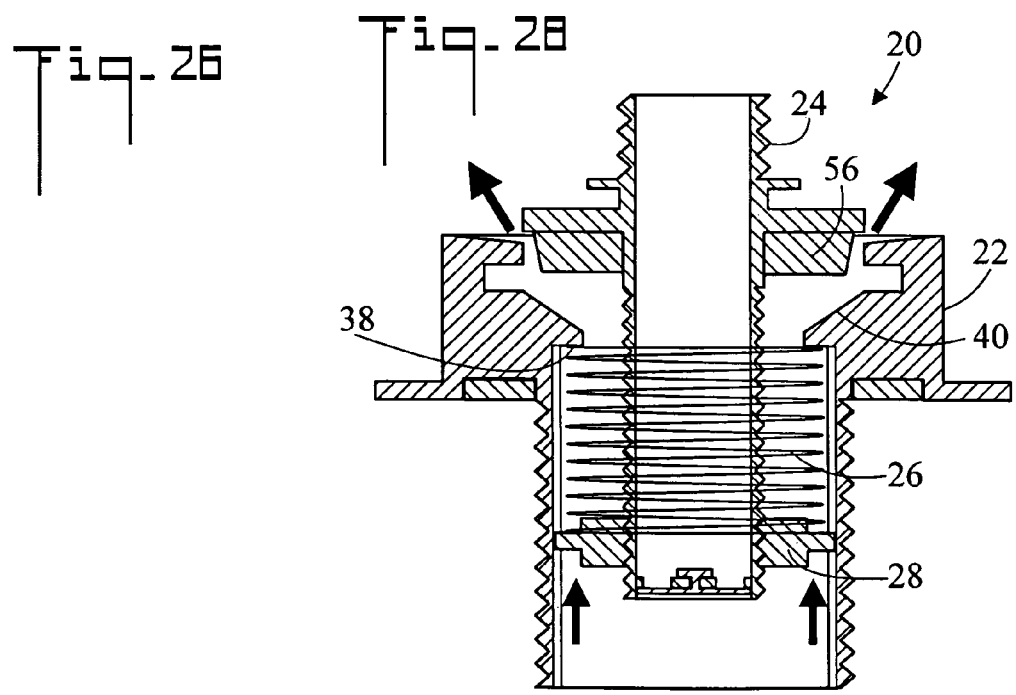
Fig. 28

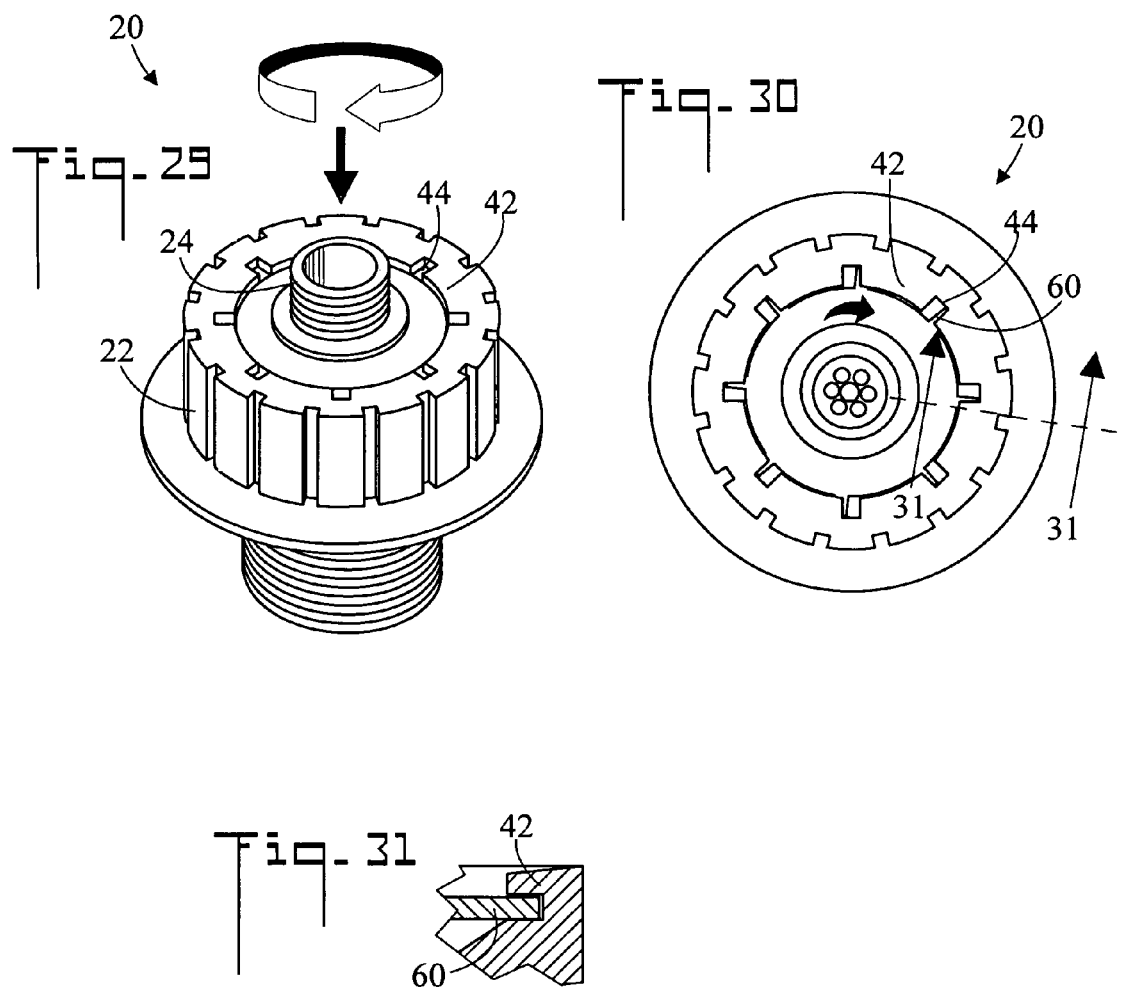

VALVE FOR AN INFLATABLE AND METHOD OF USE

TECHNICAL FIELD

The present invention pertains generally to valves for inflating inflatable devices, and more particularly to a valve which combines both inflation and pressure release functions.

BACKGROUND OF THE INVENTION

Inflatable devices are known in the art. Such devices include boats, bouys, tents or any other device which is blown up and must remain air tight. Inflation Valves are used to inflate the devices. These valves allow passage of air into the device, but do not let the air escape. A problem can exist however if the inflatable is placed in the sun or otherwise heated. The air inside will expand and can cause the inflatable to rupture. To avoid this some inflatables also have a separate pressure release valve which releases air if the pressure exceeds a certain value.

BRIEF SUMMARY OF THE INVENTION

The present invention is directed to a valve for an inflatable which includes both inflation/deflation and pressure release functions in one unit. The valve has a housing which receives a core, a spring, and a nut. The nut is threadably received by the core and slidably received by the housing, and holds the core and spring in place within the housing. The inflation function includes a one way valve, and the release pressure of the pressure release function may both be adjusted and disabled.

The present invention is novel in that it combines the following valve functions in one unit:
- an inflation mechanism;
- a deflation mechanism;
- an adjustable pressure release mechanism which activates when pressure within the inflatable reaches a release pressure, the adjustable pressure release mechanism being adjustable while the inflatable is inflated; and,
- means for disabling the adjustable pressure release mechanism.

In accordance with a preferred embodiment of the invention a valve for an inflatable includes an inflation mechanism for inflating the inflatable and a pressure release mechanism which activates when pressure within the inflatable reaches a release pressure.

In accordance with an aspect of the invention, the release pressure is adjustable.

In accordance with another aspect of the invention, the valve includes a housing having a first bore having a longitudinal axis. A core is received by the first bore, the core having a second bore, the core movable along the longitudinal axis, and the inflation mechanism includes a one way valve disposed in the second bore. A nut is threadably received by the core and slidably received by the first bore. A spring is disposed between the housing and the nut, wherein the housing, the core, the nut, and the spring combine to form the pressure release mechanism.

In accordance with another aspect of the invention, the nut is selectively longitudinally positionable along the core thereby expanding or compressing the spring to establish the release pressure.

In accordance with another aspect of the invention the first bore has a diameter D and the nut has a body which has a diameter d which is less than D.

In accordance with another aspect of the invention the first bore has a plurality of evenly spaced apart longitudinal grooves. The nut has a perimeter having a plurality of evenly spaced apart outward projections, the projections shaped and dimensioned to be slidably received by the plurality of grooves.

In accordance with another aspect of the invention, a ledge extends into first bore, and the spring is disposed between the ledge and the nut.

In accordance with another aspect of the invention, the nut is positionable along the core by pulling the core away from the housing and rotating the core.

In accordance with another aspect of the invention, the nut is selectively positionable when the inflatable is inflated.

In accordance with another aspect of the invention, the core has a gasket and the housing has a rim. The spring biases the gasket into sealing contact with the rim until a pressure within the inflatable rises to the release pressure, wherein the gasket is urged away from the rim.

In accordance with another aspect of the invention, the valve includes means for disabling the pressure release mechanism.

In accordance with another aspect of the invention, the valve includes means for disabling the valve.

In accordance with another aspect of the invention, the inflatable may be deflated by pulling the core away from the housing.

In accordance with another aspect of the invention, the valve performs the following functions;
(a) inflation;
(b) deflation;
(c) adjustable pressure release while the inflatable is inflated; and,
(d) disable pressure release.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is an exploded perspective view of a valve for an inflatable in accordance with the present invention;
FIG. 2 is a perspective view of the valve;
FIG. 6 is a cross sectional view along the line 6-6 of FIG. 3;
FIG. 7 is an enlarged top plan view of a core;
FIG. 8 is an enlarged side elevation view of the core;
FIG. 9 is a view along the line 9-9 of FIG. 8;
FIG. 10 is a cross sectional view along the line 10-10 of FIG. 7;
FIG. 11 is an enlarged cross sectional view along the line 11-11 of FIG. 10;
FIG. 12 is an enlarged top plan view of a nut;
FIG. 13 is an enlarged side elevation view of the nut;
FIG. 14 is a cross sectional view along the line 14-14 of FIG. 12;
FIG. 15 is an enlarged top plan view of a spring;
FIG. 16 is an enlarged side elevation view of the spring;
FIG. 17 is an enlarged top plan view of the valve;
FIG. 18 is a cross sectional view along the line 18-18 of FIG. 17;
FIG. 19 is another cross sectional view of the valve;
FIG. 20 is a view along the line 20-20 of FIG. 19

FIG. 23 is a perspective view of the valve;

FIG. 24 is another cross sectional view of the valve;

FIG. 25 is another cross sectional view of the valve;

FIG. 26 is another perspective view of the valve;

FIG. 27 is another cross sectional view of the valve;

FIG. 28 is another cross sectional view of the valve;

FIG. 29 is another perspective view of the valve;

FIG. 30 is a top plan view of the valve;

FIG. 31 is a fragmented cross sectional view along the line 31-31 of FIG. 30;

DETAILED DESCRIPTION OF THE INVENTION

Figure 3:
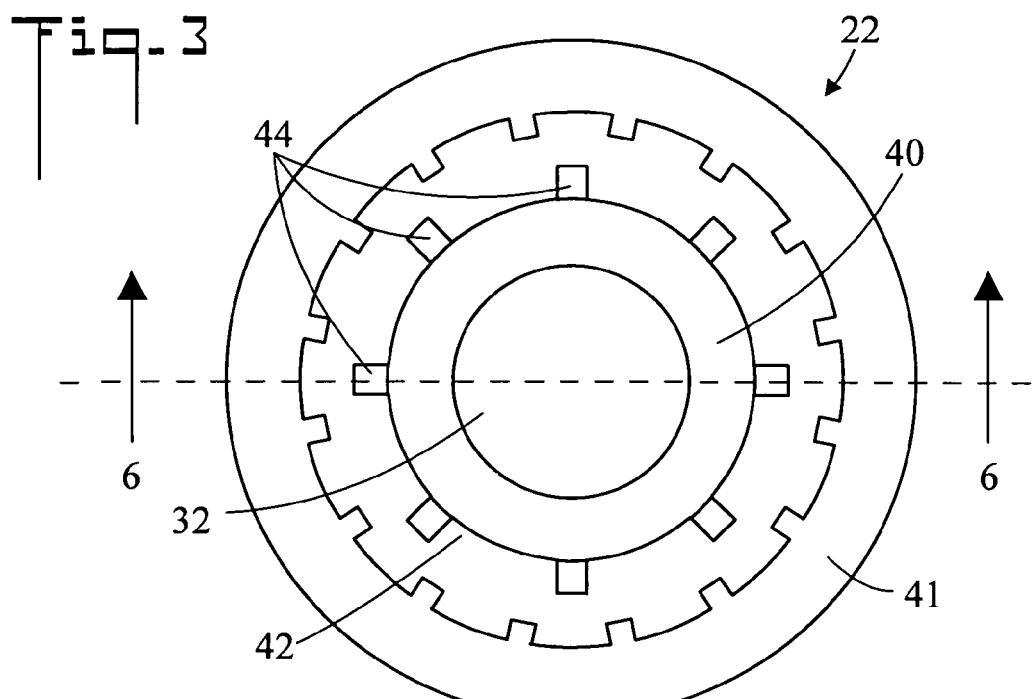
FIG. 3 is an enlarged top plan view of a housing.

Referring initially to FIGS. 1 and 2, there are illustrated exploded perspective and perspective views respectively of a valve for an inflatable in accordance with the present invention, generally designated 20. Valve 20 includes both an inflation mechanism for inflating the inflatable and a pressure release mechanism which activates when pressure within the inflatable reaches a release pressure. In a preferred embodiment of the invention the release pressure is adjustable. Valve 20 includes a circular housing 22 and a circular core 24 which is received by housing 22. A spring 26 is also received by housing 22 and partially surrounds core 24. A nut 28 is used to retain core 24 and spring 26 within housing 22. In the shown embodiment a tethered protective cap 30 is removably attached to core 24.

Figure 4:
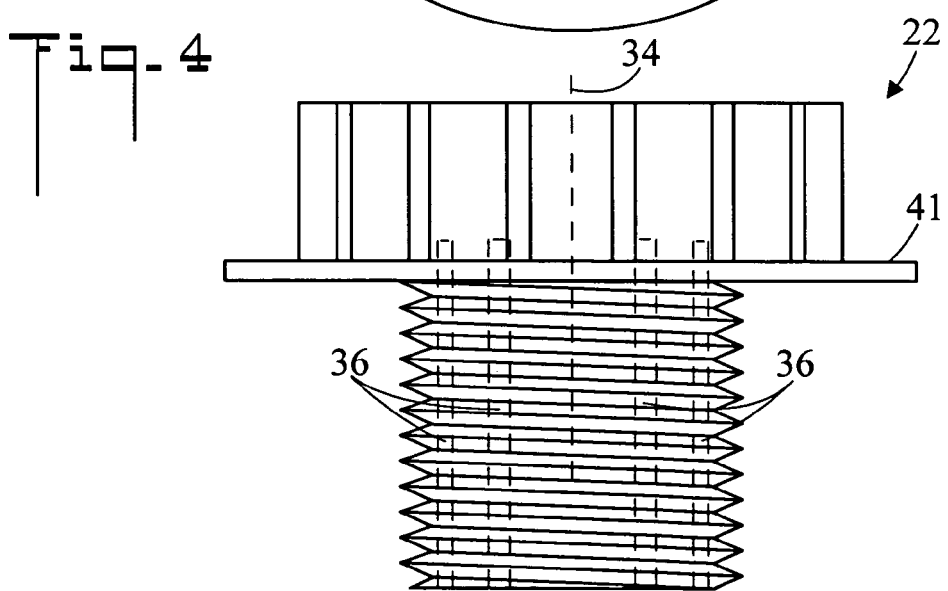
FIG. 4 is an enlarged side elevation view of the housing.
Figure 5:
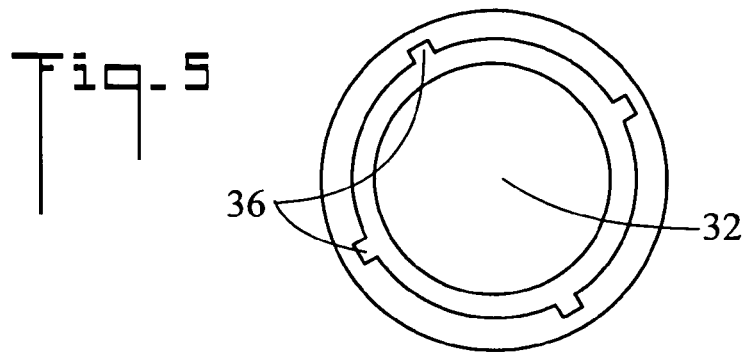
FIG. 5 is a view along the line 5-5 of FIG. 4.

FIGS. 3 and 4 are enlarged top plan and enlarged side elevation views respectively of housing 22, FIG. 5 is a view along the line 5-5 of FIG. 4, and FIG. 6 is a cross sectional view along the line 6-6 of FIG. 3. Housing 22 has a first bore 32 which has a longitudinal axis 34 and a diameter D. Housing 22 also has a circular rim 40 and a circular lip 42 having a plurality of evenly spaced apart notches 44 (eight in the shown embodiment). First bore 32 has a plurality of spaced apart longitudinal grooves 36 (four in the shown embodiment). A ledge 38 extends into first bore 32 (refer to FIG. 6). Housing 22 also includes a flange 41, a gasket 43, and a threaded portion 45 which serve to mechanically interface valve 20 with the inflatable.

FIGS. 7 and 8 are enlarged top plan and enlarged side elevation views respectively of core 24, FIG. 9 is a view along the line 9-9 of FIG. 8, FIG. 10 is a cross sectional view along the line 10-10 of FIG. 7, and FIG. 11 is an enlarged cross sectional view along the line 11-11 of FIG. 10. Core 24 is received by first bore 32 of housing 22 and is movable along longitudinal axis 34 (refer also to FIG. 18). Core 24 has a second bore 46. The inflation mechanism of valve 20 includes a one way valve 48 which is disposed in second bore 46. In the shown embodiment, one way valve includes a disc 50 which has a plurality of holes 52 (refer to FIG. 11). A circular resilient diaphragm 54 (such as of rubber) is centrally connected to disc 50. Diaphragm 54 permits air to flow in one direction but not in the opposite direction (refer to FIGS. 18 and 19 and the related discussions). Core 24 also has a gasket 56 which serves to seal valve 20 (i.e. make air tight). Core 24 also includes a circular disc 58 which has a plurality of evenly spaced apart outwardly projecting tabs 60 (eight in the shown embodiment). Tabs 60 are shaped and dimensioned to be slidably received by the plurality of notches 44 in circular lip 42 of housing 22. Core includes a threaded portion 62 which is received by nut 28. Core 24 also includes another threaded portion 64 for receiving tethered protective cap 30 (refer also to FIG. 1), and also for receiving an air supply to inflate the inflatable.

FIGS. 12 and 13 are enlarged top plan and enlarged side elevation views respectively of nut 28, and FIG. 14 is a cross sectional view along the line 14-14 of FIG. 12. Nut 28 is threadably received by core 24 and slidably received by first bore 32 of housing 22 (refer also to FIG. 18 and the discussion pertaining thereto). Nut 28 has a body 66 which has a plurality of evenly spaced apart outward projections 68 which are shaped and dimensioned to be slidably received by the plurality of longitudinal grooves 36 in first bore 32 of housing 22. Body 66 of nut 28 has a diameter d which is less than diameter D of first bore 32 (refer also to FIG. 6. This is necessary to allow air to pass between body 66 of nut 28 and the wall of first bore 32 (refer also to FIG. 21 and the related discussion). Nut 28 also has threads 70 which receive threads 62 of core 24 (refer also to FIG. 18).

FIGS. 15 and 16 are enlarged top plan and enlarged side elevation views respectively of spring 26. In the shown embodiment spring 26 is a coil spring. Spring 26 is disposed between ledge 38 of housing 22 and nut 28, wherein housing 22, core 24, nut 28, and spring 26 combining to form a pressure release mechanism. Spring 26 has a diameter which is less than the diameter D of first bore 32 (refer to FIG. 6), but which is greater than ledge 38 (refer also to FIG. 18).

FIG. 17 is an enlarged top plan view of valve 20. Core 24 is installed in housing 22 with tabs 60 received by notches 44. Also shown are second bore 46 and one way valve 48. It is noted that in this and subsequent views, tethered protective cap 30 has been omitted for clarity.

FIG. 18 is a cross sectional view along the line 18-18 of FIG. 17. It is noted that FIGS. 19 and 21-28 use this same cross sectional view. Core 24 is installed in first bore 32 of housing 22. Nut 28 receives core 24 so that nut 28 is selectively longitudinally positionable along core 24 thereby expanding or compressing spring 26 to establish a desired release pressure. Outward projections 68 of nut 28 are slidably received by longitudinal grooves 36 in first bore 32 of housing 22 (refer also to FIG. 20). Spring 26 is disposed between ledge 38 of housing 22 and outward protrusions 68 of nut 28 so that spring 26 biases gasket 56 of core 24 into sealing contact with rim 40 of housing 22. That is spring 26 pushes nut 28 and therefore core 24 down causing gasket 56 to abut 40. It is also noted that in this and subsequent views, for explanation purposes spring 26 is not shown in cross section. Pressurized air such as from a compressor (arrows) enters core 24, passes through second bore 46 and one way valve 48, and enters the inflatable (not shown). The air passes through holes in 52 in disc 50 pushes diaphragm 54 into an open state (refer also to FIG. 11). It is also noted that valve 20 may be used to deflate the inflatable by pulling core 24 away from housing 22 so that gasket 56 no longer contacts rim 40 such as is shown in FIGS. 23 and 25.

FIG. 19 is another cross sectional view of valve 20. In this view the pressurized supply of air has been discontinued, and diaphragm 54 of one way valve 48 resiliently returns to a traverse position in second bore 46 which prevents air in the inflatable from escaping though second bore 46.

FIG. 20 is a view along the line 20-20 of FIG. 19. This view shows outward protrusions 68 of nut 28 being slideably received by grooves 36 in bore 32 of housing 22.

Figure 21:
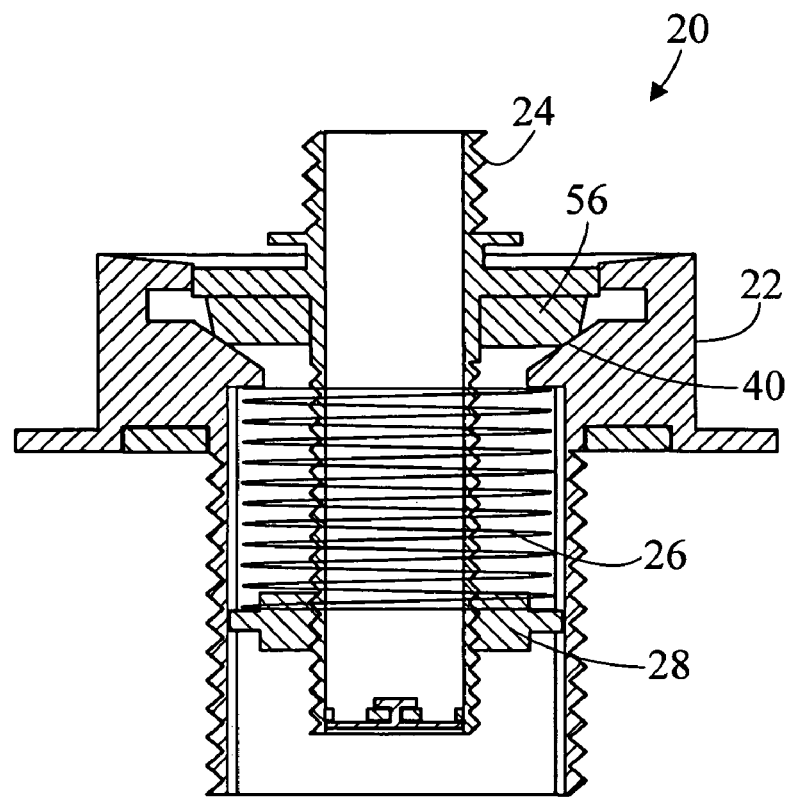
FIG. 21 is another cross sectional view of the valve.

FIG. 21 is another cross sectional view of the valve 20. Spring 26 pushes core down and thereby biases gasket 56 into sealing contact with rim 40 until a pressure within the inflatable rises to a release pressure, wherein gasket 56 is urged away from rim 40.

Figure 22:
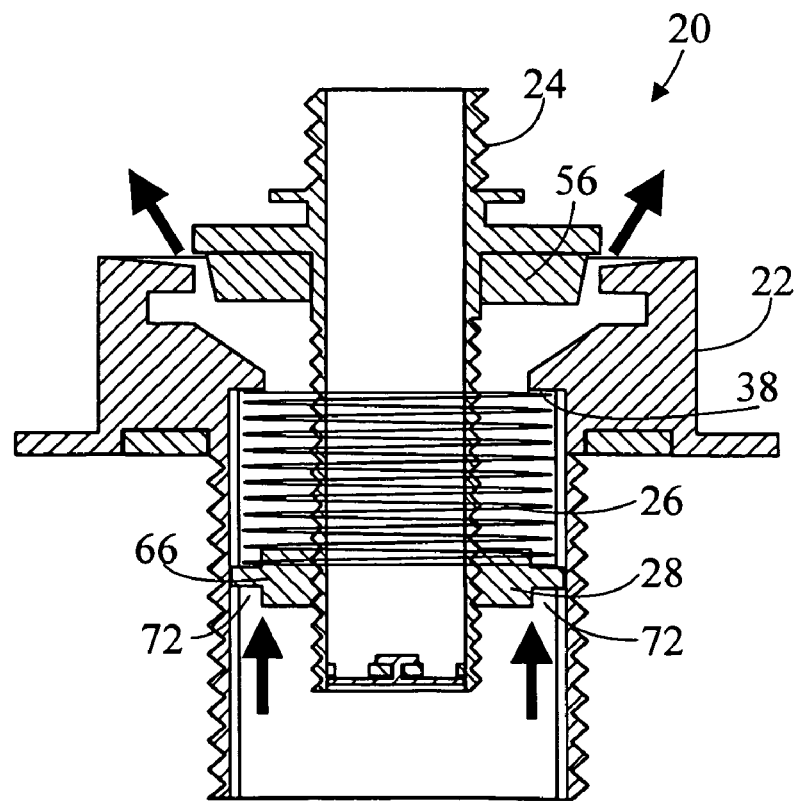
FIG. 22 is another cross sectional view of the valve.

FIG. 22 is another cross sectional view of the valve 20. In this view the pressure within the inflatable has risen to the release pressure, and therefore the pressure release mechanism is activated. Air (see arrows) passes between body 66 of nut 28 and the wall of first bore 32 at area 72 and forces gasket 56 away from rim 40 thereby escaping from the inflatable. The pounds per square inch (psi) value of the release pressure is determined by the position of nut 28 along core 24 and the resulting degree of compression of spring 26. If nut 28 is moved up toward ledge 38 spring 26 becomes more compressed and the release pressure is increased (refer to FIGS. 23-25 and the related discussion). Conversely, if nut 28 is moved down away from ledge 38 spring 26 becomes less compressed and the release pressure is decreased (refer to FIGS. 26-28).

FIG. 23 is a perspective view of valve 20, and FIGS. 24 and 25 are additional cross sectional views of valve 20. These figures show how the release pressure of valve 20 may be adjusted. Nut 28 is positionable along core 24 by pulling core 24 away from housing 24 and rotating core 24. As core 24 is rotated, nut 28 threadably advances along core 24. In FIG. 23 core 24 is pulled up away from housing 22 and rotated in a clockwise direction. As shown in FIG. 24, this causes nut 28 to threadably advance toward ledge 38 thereby increasing the compression of spring 26. In FIG. 25, this means that a larger release pressure is required to move gasket 56 away from rim 40. It is noted that in the present invention the release pressure adjustment may be made while the inflatable is inflated.

FIG. 26 is a perspective view of valve 20, and FIGS. 27 and 28 are additional cross sectional views of valve 20. In this instance the release pressure of valve 20 is adjusted in the opposite direction from FIGS. 23-25. In FIG. 26 core 24 is pulled up away from housing 22 and rotated in a counter-clockwise direction. As shown in FIG. 27, this causes nut 28 to threadably advance away from ledge 38 thereby decreasing the compression of spring 26. In FIG. 28, this means that a smaller release pressure is required to move gasket 56 away from rim 40.

FIGS. 29 and 30 are perspective and top plan views respectively of valve 20, and FIG. 31 is a fragmented cross sectional view along the line 31-31 of FIG. 30. These figures illustrate a means for disabling the pressure release mechanism of the present invention, but yet retain the inflation function. With the plurality of tabs 60 residing in the plurality of notches 44, core 24 may be pushed down toward housing 22 and then core 24 rotated so that the plurality of tabs 60 lock in place beneath circular lip 42.

Figure 32:
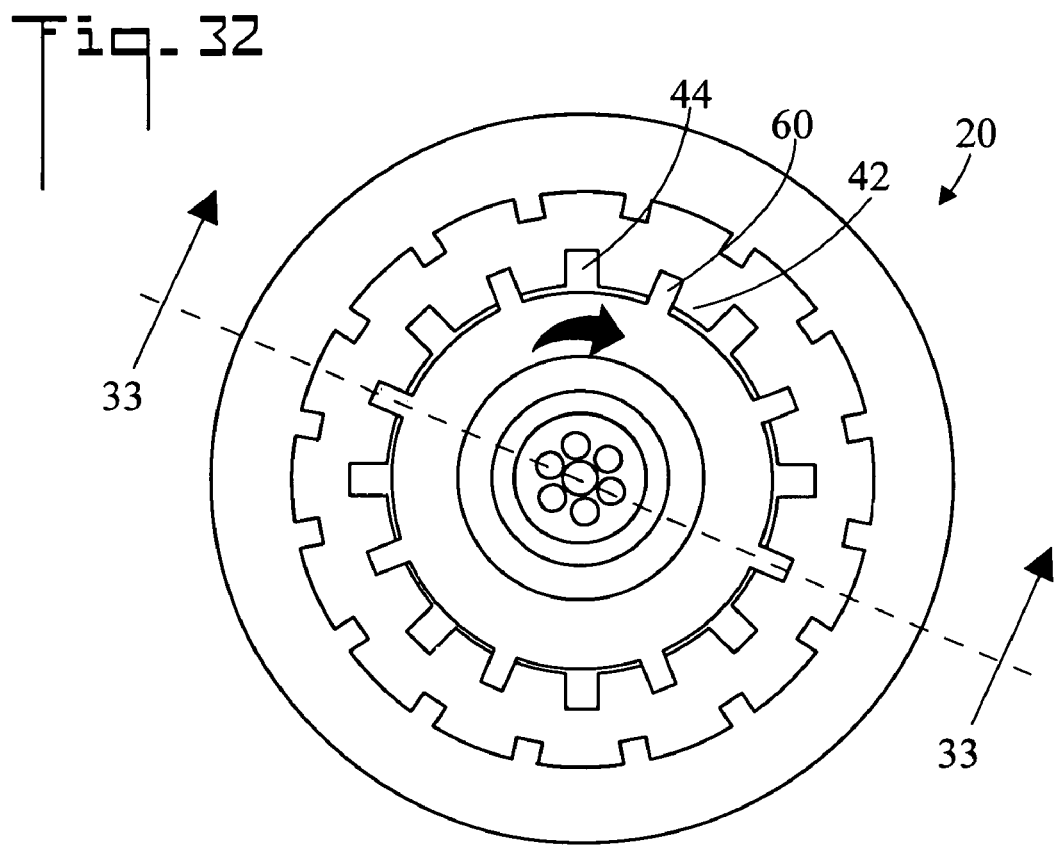
FIG. 32 is an enlarged top plan view of the valve.
Figure 33:
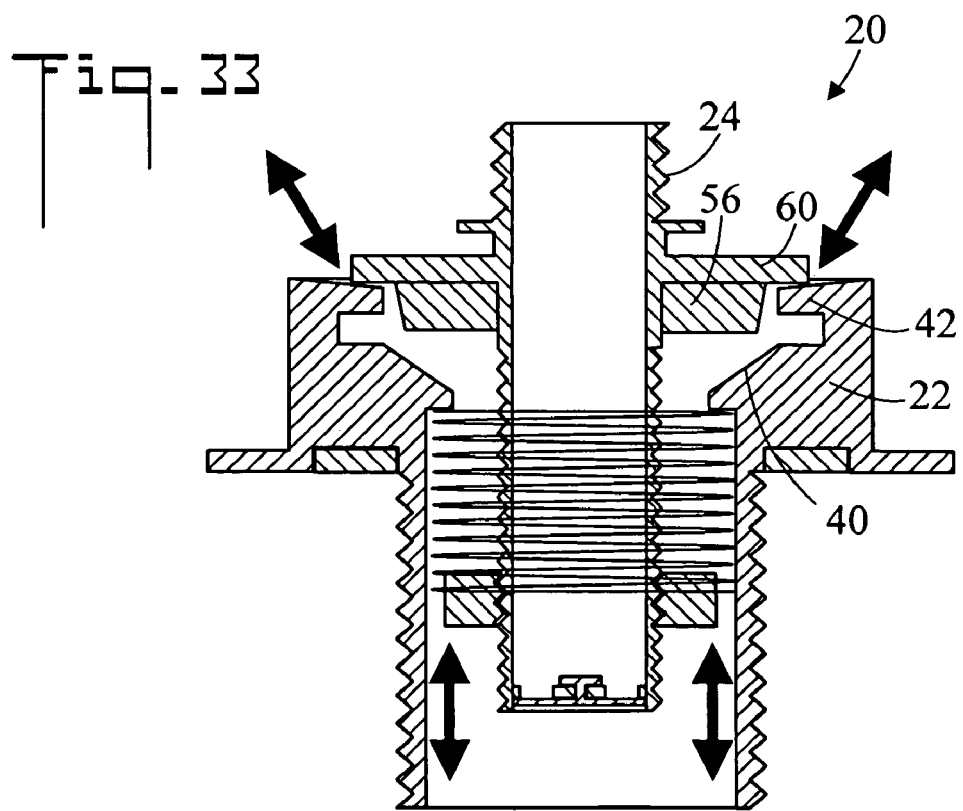
FIG. 33 is a cross sectional view along the line 33-33 of FIG. 32.

FIG. 32 is an enlarged top plan view of valve 20, and FIG. 33 is a cross sectional view along the line 33-33 of FIG. 32. These figures illustrate a means for disabling valve 20 so that neither the inflation nor pressure release functions are operable. Core 24 may be pulled away from housing 24 and rotated so that plurality of tabs 60 reside on top of lip 42. In this configuration air may freely pass in either direction through valve 20. This is a convenient way to allow the inflatable to deflate.

In an embodiment of the invention, housing 22, core 24, and nut 28 are fabricated from polyvinyl chloride (PVC). Spring 26 is fabricated from spring steel. The stiffness of spring 26 may be selected to result in a desired range of valve 0 release pressures.

In terms of use, a method for adjusting a release pressure of a valve includes:
(a) providing a valve 20 for an inflatable, including:
a housing 22 having a first bore 32 having a longitudinal axis 34;
a core 24 received by first bore 32, core 24 having a second bore 46, core 24 movable longitudinal axis 34, and an inflation mechanism including a one way valve 48 disposed in second bore 46,
a nut 28 threadably received by core 24 and slidably received by first bore 32;
a spring 26 disposed between housing 22 and nut 28, wherein housing 22, core 24, nut 28, and spring 26 combine to form a pressure release mechanism;
core 24 having a gasket 56;
housing 22 having a rim 40, wherein spring 26 biases gasket 56 into sealing contact with rim 40 until a pressure within the inflatable rises to a release pressure, wherein gasket 56 is urged away from rim 40; and,
(b) selectively positioning nut 28 along core 24 by pulling core 24 away from housing 22 and rotating core 24 a desired number of times in a desired direction.

A method for disabling the pressure mechanism of a valve includes:
(a) providing a valve 20 for an inflatable, including:
a housing 22 having a first bore 32 having a longitudinal axis 34;
a core 24 received by first bore 32, core 24 having a second bore 46, core movable along longitudinal axis 34, and an inflation mechanism including a one way valve 48 disposed in second bore 46,
a nut 28 threadably received by core 24 and slidably received by first bore 32;
a spring 26 disposed between housing 22 and nut 28, wherein housing 22, core 24, nut 28, and spring 26 combining to form a pressure release mechanism;
core 24 having a gasket 56;
housing 22 having a rim 40, wherein spring 26 biases gasket 56 into sealing contact with rim 40 until a pressure within the inflatable rises to a release pressure, wherein gasket 56 is urged away from rim 40;
housing 22 having an circular lip 42 having a plurality of evenly spaced apart notches 44;
core 24 including a circular disc 58 having a plurality of evenly spaced apart outwardly projecting tabs 60, the plurality of tabs 60 shaped and dimensioned to be slidably received by the plurality of notches 44;
(b) pushing core 24 toward housing 22 so that gasket 56 sealingly contacts rim 40; and,
(c) rotating core 24 so that the plurality of tabs 60 lock in place beneath circular lip 42.

The preferred embodiments of the invention described herein are exemplary and numerous modifications, variations, and rearrangements can be readily envisioned to achieve an equivalent result, all of which are intended to be embraced within the scope of the appended claims.

I claim:
1. A valve for an inflatable, comprising:
an inflation mechanism for inflating the inflatable;
a pressure release mechanism which activates when pressure within the inflatable reaches a release pressure;
said release pressure being adjustable;
a housing having a first bore having a longitudinal axis;
a core received by said first bore, said core having a second bore, said core movable along said longitudinal axis, and said inflation mechanism including a one way valve disposed in said second bore;
a nut threadably received by said core and slidably received by said first bore;

a spring disposed between said housing and said nut, wherein said housing, said core, said nut, and said spring combining to form said pressure release mechanism;

means for disabling said pressure release mechanism;

said housing having an circular lip, said lip having a plurality of evenly spaced apart notches;

said housing having a rim;

said core having a gasket;

said core including an circular disc having a plurality of evenly spaced apart outwardly projecting tabs, said plurality of tabs shaped and dimensioned to be slidably received by said plurality of notches; and, wherein said core may be pushed toward said housing and then said core rotated so that said plurality of tabs lock in place beneath said circular lip.

2. A valve for an inflatable, comprising:

an inflation mechanism for inflating the inflatable;

a pressure release mechanism which activates when pressure within the inflatable reaches a release pressure;

said release pressure being adjustable;

a housing having a first bore having a longitudinal axis;

a core received by said first bore, said core having a second bore, said core movable along said longitudinal axis, and said inflation mechanism including a one way valve disposed in said second bore;

a nut threadably received by said core and slidably received by said first bore;

a spring disposed between said housing and said nut, wherein said housing, said core, said nut, and said spring combining to form said pressure release mechanism;

means for disabling said valve;

said housing having an circular lip, said lip having a plurality of evenly spaced apart notches;

said core including an circular disc having a plurality of evenly spaced apart outwardly projecting tabs, said plurality of tabs shaped and dimensioned to be slidably received by said plurality of notches; and, wherein said core may be pulled away from said housing and rotated so that said plurality of tabs reside on top of said lip.

3. A valve for an inflatable, comprising:

an inflation mechanism for inflating the inflatable;

a pressure release mechanism which activates when pressure within the inflatable reaches a release pressure;

said release pressure being adjustable;

a housing having a first bore having a longitudinal axis;

a core received by said first bore, said core having a second bore, said core movable along said longitudinal axis, and said inflation mechanism including a one way valve disposed in said second bore;

a nut threadably received by said core and slidably received by said first bore;

a spring disposed between said housing and said nut, wherein said housing, said core, said nut, and said spring combining to form said pressure release mechanism;

said nut selectively longitudinally positionable along said core thereby expanding or compressing said spring to establish said release pressure;

said first bore having a diameter D;

said nut having a body having a diameter d, wherein d is less than D;

said first bore having a plurality of evenly spaced apart longitudinal grooves;

said nut having a perimeter having a plurality of evenly spaced apart outward projections, said projections shaped and dimensioned to be slidably received by said plurality of grooves;

a ledge extending into said first bore;

said spring disposed between said ledge and said nut;

said nut positionable along said core by pulling said core away from said housing and rotating said core;

said nut selectively positionable when the inflatable is inflated;

said core having a gasket;

said housing having a rim, wherein said spring biases said gasket into sealing contact with said rim until a pressure within the inflatable rises to said release pressure, wherein said gasket is urged away from said rim;

said housing having an circular lip, said lip having a plurality of evenly spaced apart notches;

the inflatable may be deflated by pulling said core away from said housing, said core including an circular disc having a plurality of evenly spaced apart outwardly projecting tabs, said plurality of tabs shaped and dimensioned to be slidably received by said plurality of notches; and, wherein said core may be pushed toward said housing and then said core rotated so that said plurality of tabs lock in place beneath said circular lip.

4. A method for disabling the pressure release mechanism of a valve, comprising:

(a) providing a valve for an inflatable, including:

a housing having a first bore having a longitudinal axis;

a core received by said first bore, said core having a second bore, said core movable along said longitudinal axis, and said inflation mechanism including a one way valve disposed in said second bore, a nut threadably received by said core and slidably received by said first bore;

a spring disposed between said housing and said nut, wherein said housing, said core, said nut, and said spring combining to form a pressure release mechanism;

said core having a gasket;

said housing having a rim, wherein said spring biases said gasket into sealing contact with said rim until a pressure within the inflatable rises to a release pressure, wherein said gasket is urged away from said rim;

said housing having an circular lip, said lip having a plurality of evenly spaced apart notches;

said core including a circular disc having a plurality of evenly spaced apart outwardly projecting tabs, said plurality of tabs shaped and dimensioned to be slidably received by said plurality of notches;

(b) pushing said core toward said housing so that said gasket sealingly contacts said rim; and, (c) rotating said core so that said plurality of tabs lock in place beneath said circular lip.

* * * * *